(12) United States Patent
Ichikawa et al.

(10) Patent No.: US 7,276,823 B2
(45) Date of Patent: Oct. 2, 2007

(54) ACTIVE VIBRATION DAMPING DEVICE

(75) Inventors: Hiroyuki Ichikawa, Kani (JP);
Yoshinori Watanabe, Inuyama (JP)

(73) Assignee: Tokai Rubber Industries, Ltd.,
Komaki (JP)

( * ) Notice: Subject to any disclaimer, the term of this patent is extended or adjusted under 35 U.S.C. 154(b) by 172 days.

(21) Appl. No.: 11/268,512

(22) Filed: Nov. 8, 2005

(65) Prior Publication Data
US 2006/0097587 A1    May 11, 2006

(30) Foreign Application Priority Data
Nov. 11, 2004   (JP)   ............... 2004-328195

(51) Int. Cl.
*H02K 7/06* (2006.01)
(52) U.S. Cl. .......................... 310/23; 310/51
(58) Field of Classification Search ............ 310/12–15, 310/17, 23, 51; 267/140.1; 180/312
See application file for complete search history.

(56) References Cited

U.S. PATENT DOCUMENTS 5,004,215 A * 4/1991 Aubry et al. .......... 267/140.13
5,992,582 A * 11/1999 Lou et al. ................ 188/267.1
6,202,806 B1 * 3/2001 Sandrin et al. .......... 188/267.1
6,340,080 B1 * 1/2002 Carlson .................... 188/267.2

FOREIGN PATENT DOCUMENTS

| EP | 1 560 230 A1 | 8/2005 |
| JP | A 9-49541 | 2/1997 |
| JP | A 2000-283214 | 10/2000 |

* cited by examiner

*Primary Examiner*—Thanh Lam
(74) *Attorney, Agent, or Firm*—Oliff & Berridge, PLC (57) ABSTRACT

An active vibration damping device having a solenoid actuator designed with a movable element positioned inserted into a guide hole of a stator having a yoke member is attached about a coil to form a stator-side magnetic path with the guide hole lying on its center axis, so that current passed through the coil creates actuating force in the axial direction between the stator and the movable element. A magnetic acting force stabilizing portion having a shape that gradually varies in association with axial displacement of the movable element an level of magnetic acting force between a movable element-side magnetic pole forming portion and a stator-side magnetic pole forming portion is disposed on the movable element-side magnetic pole forming portion where a magnetic pole is produced in the movable element and/or the stator-side magnetic pole forming portion where a magnetic pole is produced in the stator.

8 Claims, 7 Drawing Sheets

PRIOR ART

ACTIVE VIBRATION DAMPING DEVICE

INCORPORATED BY REFERENCE

The disclosure of Japanese Patent Application No. 2004-328195 filed on Nov. 11, 2004 including the specification, drawings and abstract is incorporated herein by reference in its entirety.

BACKGROUND OF THE INVENTION

1. Field of the Invention

The present invention relates to an active vibration damping device for use as an automotive engine mount, body mount, or the like in order to produce active or countervailing damping action of vibration to be damped, and relates in particular to an active vibration damping device adapted to provide active vibration damping action by means of employing an oscillation member to constitute part of the wall of a pressure receiving chamber with a non-compressible fluid sealed therein, and controlling pressure within the pressure receiving chamber by means of exciting actuation of the oscillation member with a solenoid type actuator.

2. Description of the Related Art

Active vibration damping devices that reduce vibration actively and/or in compensating manner by means of imparting excitation force to a member to be damped or to a vibration damping device are known as one type of damper or other vibration damping device for installation in a vibration damping support or vibration damping connector interposed between components making up a vibration transmission system, or on members to be damped.

Such a vibration damping device typically comprises a pressure receiving chamber a portion of whose wall is composed of a main rubber elastic body linking a first mounting member and a second mounting member; and an oscillation member making up part of the wall of the pressure receiving chamber, and actuated from the outside under the control of an actuator. Such devices are taught in JP-A-9-49541 and JP-A-2000-283214, for example. In this kind of active vibration damping device, pressure within the pressure receiving chamber is regulated according to the input vibration to be damped, so as to be able to cancel out the input vibration to provide active vibration damping action.

Fluid filled type active vibration damping devices of this kind are often mass produced and shipped as a series. Thus, in terms of achieving better commercial value and reliability in active vibration damping devices as commercial products, it is essential to minimize deviation in vibration damping characteristics among individual units, so that more consistent characteristics are provided over the entire series.

Accordingly, thoroughgoing quality control of the electromagnetic actuator installed in the vibration damping device unit has been contemplated. The electromagnetic actuator typically has a structure wherein a stator having a yoke member attached about a coil to form a stator-side magnetic path is housed within a housing affixed to the vibration damping device unit, and a moving member is positioned displaceably in the axial direction in a center hole in the stator. In an electromagnetic actuator of this kind, it is contemplated to carry out quality control such that to the greatest extent possible a constant value is maintained for the relative positional relationship of the stator to the magnetic gap disposed on the magnetic path formed by the coil. This is because the output level of an electromagnetic actuator is determined depending on the distance separating the stator and the yoke member forming the magnetic gap on the magnetic path.

In active vibration damping devices of this kind to date, it was extremely difficult to minimize deviation in the distance separating the yoke member and the stator, among individual units of product.

The reason is that typically, a rubber elastic body is used for the purpose of displaceably supporting the oscillation member. However, since a rubber elastic body can experience molding shrinkage, it is not possible to control dimensions with high accuracy, unlike metal fittings. Additionally, permanent set in fatigue of the rubber elastic body in association with deterioration over time can be the cause of deviation in the distance separating the yoke member and the stator.

Furthermore, the distance separating the yoke member and the stator can be affected by component dimension errors or assembly errors of the yoke member or stator per se, or of components that directly or indirectly relate to positioning thereof.

In this way, the distance separating the yoke member and the stator is determined by numerous factors, and it is impossible to control all of these numerous factors with a high degree of accuracy. In addition to the fact that settings for the separating distance are extremely small, since magnetic acting force varies exponentially depending on the distance between magnetic poles, such small deviations will be manifested as very large deviations in vibration damping characteristics among individual active vibration damping devices.

SUMMARY OF THE INVENTION

It is an object of the present invention to provide an active vibration damping device of novel construction in which deviation in vibration damping characteristics among individual product units due to manufacturing errors of the rubber elastic body or the like in vibration damping device units can be reduced, thereby providing consistent characteristics over the series.

The above and/or optional objects of this invention may be attained according to at least one of the following modes of the invention. The following modes and/or elements employed in each mode of the invention may be adopted at any possible optional combinations. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

A first mode of the invention provides an active vibration damping device comprising: a first mounting member and a second mounting member, the members attachable respectively to components linked to each other to make up a vibration transmission system; a main rubber elastic body elastically linking the first and second mounting members, defining one portion of a wall of a pressure receiving chamber having a non-compressible fluid sealed therein; an oscillation member defining another portion of the wall of the pressure receiving chamber; a solenoid actuator including: a stator having a coil and a yoke member attached about the coil to form a stator-side magnetic path with a guide hole extending along a center axis thereof; and a movable element positioned inserted into the guide hole of the stator so that actuating force in an axial direction is create between the stator and the movable element by means of supplying electrical current to the coil, the stator of the solenoid actuator being affixed to the second mounting member and the movable element being attached to the oscillation member so as to actively control pressure in the pressure receiving chamber by exciting actuation of the oscillation member, and a magnetic acting force stabilizing portion having a shape that gradually varies in association with axial displacement of the movable element an level of magnetic acting force between a movable element-side magnetic pole forming portion and a stator-side magnetic pole forming portion is disposed on at least one of the movable element-side magnetic pole forming portion where a magnetic pole is produced in the movable element and the stator-side magnetic pole forming portion where a magnetic pole is produced in the stator.

In the active vibration damping device constructed according to this mode, the level of magnetic acting force exerted on the movable element by current passing through the coil is gradually varied by the magnetic acting force stabilizing portion, whereby change in magnetic acting force due to change in the position of the movable element relative to the stator can be reduced. Thus, even where due to component manufacturing tolerances, assembly errors, or the like, there is a certain amount of deviation among individual product units in terms of relative position of the stator and the movable element, the difference in the among of magnetic acting force exerted on the movable element can be held to a minimum, and deviation in output characteristics can be reduced. Accordingly, consistent characteristics can be provided over the entire series of active vibration damping devices.

Even where some variation in relative position of the stator and the movable element should occur, since there will be no abrupt change in the level of magnetic acting force exerted on the movable element, in the event that, for example, the rubber elastic body supporting the excitation plate coupled with the movable element should experience permanent set in fatigue due to deterioration over time so that the relative position of the movable element with respect to the stator changes, nonetheless abrupt change in output characteristics will be suppressed. It is possible thereby to achieve output characteristics that are stable over an extended period.

It is possible to design magnetic acting force stabilizing portions of various shapes. While several preferred modes for the magnetic acting force stabilizing portion are shown below, these are not limiting. The magnetic acting force stabilizing portion may be disposed on either the movable element-side magnetic pole forming portion or the stator-side magnetic pole forming portion, or both. Several movable element-side magnetic pole forming portions and the stator-side magnetic pole forming portions may be provided. In such a construction, magnetic acting force stabilizing portions may be provided to all of the movable element-side magnetic pole forming portions and the stator-side magnetic pole forming portions, or to some of them.

The second mode of the invention provides an active vibration damping device according to the aforementioned first mode, wherein the magnetic acting force stabilizing portion is constituted by varying a separating distance between a movable element-side magnetic pole end face of the movable element-side magnetic pole forming portion situated in opposition to the stator-side magnetic pole forming portion, and a stator-side magnetic pole end face of the stator-side magnetic pole forming portion situated in opposition to the magnetic pole side magnetic pole forming portion, in a circumferential direction of the movable element and/or an actuation axis direction of the stator.

In the active vibration damping device of this construction, by varying the shape of the movable element-side magnetic pole end face and the stator-side magnetic pole end face, the magnetic acting force stabilizing portion can be constituted with a simple design, without the need for any special components.

The distance separating the movable element-side magnetic pole end face and the stator-side magnetic pole end face is equivalent to the length of the lines of magnetic force exiting from the stator-side magnetic pole end face and entering the movable element-side magnetic pole end face, or of those exiting the movable element-side magnetic pole end face and entering the stator-side magnetic pole end face, and represents the distance between the opposing faces thereof in various directions, such as the axial direction, axis-perpendicular direction, or diagonal direction, depending on the specific shape and placement structure of the stator and the movable element. In most cases, it will be considered as the distance between points situated in closest proximity to one another, on the stator-side magnetic pole end face and the movable element-side magnetic pole end face.

A third mode of the invention provides an active vibration damping device according to the aforementioned second mode, wherein the magnetic acting force stabilizing portion is constituted by giving the stator-side magnetic pole end face a tapered shape gradually decreasing in diameter in an attraction direction of the movable element. In the active vibration damping device of this construction, the active vibration damping device of the second mode can be realized advantageously. Specifically, by constituting the stator-side magnetic pole end face as a tapered face, the distance separating the movable element-side magnetic pole end face and the stator-side magnetic pole end face can be made to vary in the direction of the actuation axis of the movable element.

In this mode, where the distance separating the stator-side magnetic pole end face and the movable element-side magnetic pole end face in the axis-perpendicular direction is too great, it will be difficult to effectively achieve magnetic acting force, and thus in preferred practice this distance at the location of maximum separation in the axis-perpendicular direction will be set to no more than 1.0 mm, preferably no more than 0.5 mm, and still more preferably no more than 0.2 mm. If on the other hand the separating distance is too small, it becomes difficult to achieve a shape significantly different from the conventional one, and the effect of gradually varying magnetic acting force will not be effectively achieved, so in preferred practice the separating distance will be at least 0.01 mm. For these reasons as well, in this mode the slope angle of the tapered face is preferably 0.5°-10°, more preferably 1.0-5.0°.

A fourth mode of the invention provides an active vibration damping device according to any one of the aforementioned first through third modes, wherein the magnetic acting force stabilizing portion is constituted by giving the stator-side magnetic pole end face a stepped face that is smaller in diameter in an attraction direction of the movable element. In the active vibration damping device of this construction, the active vibration damping device of the second mode can be realized advantageously. Specifically, by constituting the stator-side magnetic pole end face as a stepped face, the distance separating the movable element-side magnetic pole end face and the stator-side magnetic pole end face can be made to vary in the direction of the actuation axis of the movable element.

In this mode as well, in order to effectively achieve magnetic acting force while gradually varying the magnetic acting force, the separating distance at the location of maximum separation in the axis-perpendicular direction will be no more than 1.0 mm, preferably no more than 0.5 mm, and still more preferably no more than 0.2 mm, on the one hand, while being at least 0.01 mm on the other.

A fifth mode of the invention provides an active vibration damping device according to any one of the aforementioned second through fourth modes, wherein the magnetic acting force stabilizing portion is constituted by forming a circumferential groove that opens onto an outer circumferential surface of the movable element to provide the movable element-side magnetic pole end face on a wall of the circumferential groove, and varying an axial height dimension of the movable element-side magnetic pole end face along a circumferential direction.

In the active vibration damping device of this construction, by means of varying the groove shape of the circumferential groove in the circumferential direction of the movable element, without employing any special component, the distance separating the movable element-side magnetic pole end face and the stator-side magnetic pole end face can be made to vary along the circumferential direction of the movable element, and the active vibration damping device of the second mode can be realized advantageously. Additionally, by combining this mode with the active vibration damping device of construction according to the third or fourth mode described above, it becomes possible for the distance separating the movable element-side magnetic pole end face and the stator-side magnetic pole end face to be varied in the both the circumferential direction and the actuation axis direction of the movable element.

A multiplicity of circumferential grooves may be provided. In this case, a multiplicity are provided, magnetic acting force stabilizing portions may be disposed in all of the circumferential grooves, or magnetic acting force stabilizing portions disposed in only some of these. As regards the specific shape of the circumferential groove, it is possible to employ any of various shapes such as a sloping face, undulating face, stepped face, or the like.

A sixth mode of the invention provides an active vibration damping device according to any one of the aforementioned first through fifth modes, wherein the magnetic acting force stabilizing portion is constituted by varying a thickness dimension of at least one of the movable element-side magnetic pole end face and the stator-side magnetic pole end face, along an actuation axis direction of the movable element.

In the active vibration damping device of this construction, by means of varying in the actuation axis direction of the movable element the number of lines of magnetic force flowing through the movable element-side side magnetic pole forming portion and/or the stator-side magnetic pole forming portion, abrupt change in magnetic acting force due to change in the position of the movable element relative to the stator can be reduced.

As an example of a specific construction for varying the thickness dimension of the movable element-side magnetic pole forming portion and/or the stator-side magnetic pole forming portion along the actuation axis direction of the movable element, in the circumferential direction of the movable element and the stator there can be formed in the magnetic pole forming portions grooves that vary in groove width dimension in the actuation axis direction of the movable element. The thickness dimension of the magnetic pole forming portions can be of uniform or nonuniform dimension in the circumferential direction of the movable element and the stator.

A seventh mode of the invention provides an active vibration damping device according to any one of the aforementioned first through sixth modes, wherein the movable element-side magnetic pole forming portion of the movable element and the stator-side magnetic pole forming portion of the stator are arranged, at their initial position prior to current flow through the coil, at a location where maximum magnetic acting force is produced in the movable element-side magnetic pole forming portion and the stator-side magnetic pole forming portion.

In the active vibration damping device of this construction, it is possible to achieve effective initial actuating force on the movable element. Additionally, since the magnetic acting force exerted on the movable element does not change abruptly despite some displacement of the movable element from the location of maximum magnetic acting force, a consistent level of magnetic acting force can be achieved over a predetermined actuation range.

An eight mode of the invention provides an active vibration damping device according to any one of the aforementioned first through seventh modes, wherein a through-hole is disposed passing through the movable element in the axial direction, an inner rod projecting from the oscillation member is passed through the through-hole, and the movable element is linked to the inner rod so as to enable adjustment of axial position.

In the active vibration damping device of this construction, it is possible to adjust the position of the movable element relative to the stator in the axial direction, by means of adjusting the axial position of the movable element to the inner rod. With this arrangement, it is possible to further reduce deviation of the distance separating the movable element and the stator, among individual product units.

As will be apparent from the preceding description, in active vibration damping devices constructed according to the present invention, by means of suppressing abrupt change in the level of magnetic acting force exerted on the movable element, deviation in vibration damping characteristics among individual product units due to deviation among individual vibration damping device units in the distance separating the movable element and the stator can be reduced. Thus, it becomes possible to provide consistent characteristics over a series of active vibration damping devices, and to improve the commercial value and reliability of products.

BRIEF DESCRIPTION OF THE DRAWINGS

The forgoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
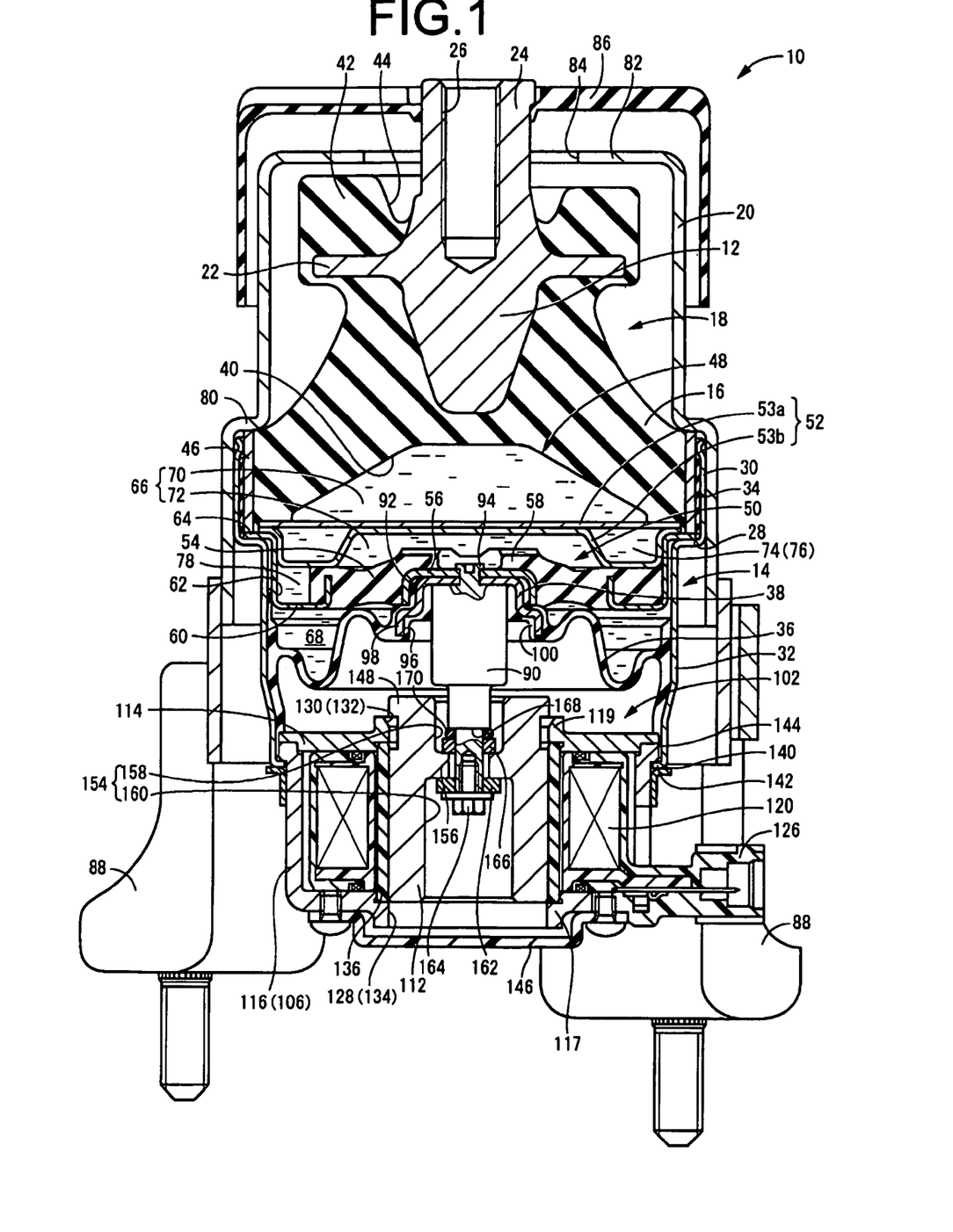
FIG. 1 is an elevational view in axial or vertical cross section of an active vibration damping device in the form of an engine mount of construction according to a first embodiment of the present invention.

Referring first to FIG. 1, there is shown an active vibration damping device in the form of an automotive engine mount 10 of construction according to a first embodiment of the present invention. The arrangement of this engine mount 10 has a mount body 18 composed of a metallic first mounting member 12, and a metallic second mounting member 14, positioned in opposition and spaced apart from one another, and elastically linked by means of a main rubber elastic body 16 interposed between them; and installed fitting within a stopper fitting 20 of metal. With the first mounting member 12 attached to a power unit (not shown) and the second mounting member 14 attached to an automobile body (not shown), the power unit is supported on the body in a vibration-damped manner. In this installed state, the distributed load of the power unit is exerted on the engine mount 10, across the first mounting member 12 and the second mounting member 14 in the mounting center axis direction, which is the vertical direction in FIG. 1, whereby the main rubber elastic body 16 undergoes elastic deformation in the direction bringing the first mounting member 12 and the second mounting member 14 closer together. The principle vibrations to be damped are also input across the first mounting member 12 and the second mounting member 14, in the directions urging the two mounting members 12, 14 closer together/apart. In the description hereinbelow, unless indicated otherwise, vertical direction refers to the vertical direction in FIG. 1.

To describe in greater detail, the first mounting member 12 has an inverted frustoconical shape. At the large-diameter end of the first mounting member 12 there is integrally formed an annular disk shaped stopper portion 22 that projects out on the outer peripheral face. Additionally, an integral fastening shaft 24 projects axially upward from the large-diameter end, and a fastening screw hole 26 that opens onto the upper end face is formed in the fastening shaft 24. By means of a fastening bolt (not shown) screwed into this fastening screw hole 26, the first mounting member 12 is attached to the automobile's power unit, not shown.

The second mounting member 14 has a large-diameter, generally cylindrical shape. A shoulder portion 28 is formed in the axially medial portion of the second mounting member 14; to either side of this shoulder portion 28, the side axially above constitutes a large-diameter section 30, while the side axially constitutes a small-diameter section 32. The inside peripheral face of the large-diameter section 30 is covered by an adhering thin seal rubber layer 34. A diaphragm 36 consisting of a thin rubber film is disposed as a flexible film, in proximity to the lower open end of the small-diameter section 32; by means of vulcanization bonding the outer peripheral edge portion of the diaphragm 36 to the inside peripheral face of the small-diameter section 32 of the second mounting member 14, the lower open end of the second mounting member 14 is provided with fluidtight closure. A connecting fitting 38 is vulcanization bonded to the center portion of the diaphragm 36.

The first mounting member 12 is positioned axially above and spaced apart from the second mounting member 14, with the first mounting member 12 and the second mounting member 14 being linked elastically by means of the main rubber elastic body 16.

The main rubber elastic body 16 has a generally frustoconical shape overall, with a conical recess face 40 formed on the large-diameter end face. The first mounting member 12 is inserted into the small-diameter end of the main rubber elastic body 16, and vulcanization bonded therewith. The stopper portion 22 of the first mounting member 12 is superposed against the small-diameter face of the main rubber elastic body 16 and vulcanization bonded thereto so as to be sheathed by the main rubber elastic body 16, and an abutting rubber 42 integrally formed with the main rubber elastic body 16 projects upwardly from the stopper portion 22, with a groove 44 formed on the inner side of the abutting rubber 42. A connecting sleeve 46 is vulcanization bonded to the outer circumferential surface at the large-diameter end of the main rubber elastic body 16.

The connecting sleeve 46 vulcanization bonded to the outer circumferential surface at the large-diameter end of the main rubber elastic body 16 is fitted within the large-diameter section 30 of the second mounting member 14, and the large-diameter section 30 is then subjected to a diameter reduction process thereby securing the main rubber elastic body 16 mated fluidtightly with the second mounting member 14. By so doing, the axial upper opening of the second mounting member 14 is provided with fluidtight closure by the main rubber elastic body 16, thereby forming between the opposing faces of the main rubber elastic body 16 and the diaphragm 36 in the second mounting member 14 interior a fluid chamber 48 that constitutes a sealed zone fluidtightly isolated from the outside, with a non-compressible fluid being sealed within this fluid chamber 48.

As the non-compressible fluid sealed therein, there may be employed water, an alkylene glycol, a polyalkylene glycol, silicone oil, or the like; in preferred practice, in order to effectively achieve vibration damping action on the basis of fluid resonance action, a low-viscosity fluid of 0.1 Pa·s or less will be employed.

A partition member 50 and an orifice member 52 are also assembled with the second mounting member 14, disposed between the opposing faces of the main rubber elastic body 16 and the diaphragm 36.

The partition member 50 has a support rubber elastic body 54 extending out with predetermined thickness, and an oscillation plate 56 constituting the oscillation member is vulcanization bonded to the center portion of this support rubber elastic body 54. The oscillation plate 56 is of shallow inverted cup shape, and is vulcanization bonded at its outside peripheral edge to the inside peripheral edge of the support rubber elastic body 54. A thick cushioning portion 58 is formed by extending the support rubber elastic body 54 around to the upper side of the oscillation plate 56.

An outer peripheral fitting 60 is vulcanization bonded to the outside peripheral edge of the support rubber elastic body 54, and a circumferential groove extending a predetermined distance in the circumferential direction is formed in the outer peripheral fitting 60. The upper axial opening of this outer peripheral fitting 60 is constituted as a flange portion 64 that flares diametrically outward; the flange portion 64 is juxtaposed against the shoulder portion 28 of the second mounting member 14, and secured clamped between the shoulder portion 28 and the connecting sleeve 46. With this arrangement, the partition member 50 is positioned extending in the axis-perpendicular direction in the medial portion between the opposing faces of the main rubber elastic body 16 and the diaphragm 36, bifurcating the interior of the second mounting member 14 to either side in the axial direction. Thus, to either side of the partition member 50, an working fluid chamber 66 a part of whose wall is constituted by the main rubber elastic body 16 and that undergoes pressure fluctuations based on elastic deformation of the main rubber elastic body 16 during vibration input is formed to the upper side thereof. To the lower side of the partition member 50, meanwhile, there is formed an equilibrium chamber 68 a part of whose wall is constituted by the diaphragm 36, and that readily permits change in volume.

The orifice member 52 is composed of upper and lower thin plates 53a, 53b superimposed on one another, and its outer peripheral edge is juxtaposed against the flange portion 64 of the outer peripheral fitting 60, and clamped between the flange portion 64 and the inside peripheral edge of the large-diameter end portion of the main rubber elastic body 16, and fixedly supported thereby by the second mounting member 14 via the main rubber elastic body 16. With this arrangement, the orifice member 52 is positioned extending in the axis-perpendicular direction in the medial portion between the opposing faces of the main rubber elastic body 16 and the partition member 50, bifurcating the interior of the working fluid chamber 66 to either side in the axial direction.

At the outer peripheral edge portion of the orifice member 52, there is formed a circumferential passage 74 extending continuously in the circumferential direction between the juxtaposed faces of the upper and lower thin plates 53a, 53b. A first end of this circumferential passage 74 connects to a pressure receiving chamber 70, and the other end connects to an excitation chamber 72. With this arrangement, there is formed a first orifice passage 76 by which the pressure receiving chamber 70 and the excitation chamber 72 communicate with one another. The first orifice passage 76 is tuned, for example, to a middle frequency range of about 30-40 Hz corresponding to engine vibration or the like.

The outside edge portion of the orifice member 52 is superposed on the outside peripheral edge portion of the partition member 50, and a second orifice passage 78 is formed by covering a circumferential groove 62 formed in the outside peripheral edge of the outer peripheral fitting 60. This second orifice passage 78 connects at one end thereof to the pressure receiving chamber 70 via the excitation chamber 72 and the first orifice passage 76, while the other end connects to the equilibrium chamber 68. With this arrangement, there is formed a second orifice passage 78 through which the pressure receiving chamber 70 and the equilibrium chamber 68 communicate with one another. This second orifice passage 78 is tuned to a middle frequency range of about 10 Hz corresponding to engine shake or the like.

The specific forms and tuning of the orifice passages are not limited in any particular way; besides the embodiments discussed above, it would also be possible, for example, to bore through the center portion of the orifice member 52 to form a first orifice passage of through-hole form through which the pressure receiving chamber 70 and the excitation chamber 72 can communicate directly, and tuning this first orifice passage to a high frequency range of about 50-150 Hz corresponding to rumble noise or the like, while forming the second orifice passage by means of directly connecting in series the circumferential passage 74 of the orifice member 52 and the circumferential groove 62 of the outer peripheral fitting 60.

Additionally, the mount body 18 constructed in the above manner is attached to the body of the automobile, not shown, via the stopper fitting 20, with the second mounting member 14 fitted into the stopper fitting 20.

The stopper fitting 20 has the form of a large-diameter shouldered cylinder, the lower side of which is larger in diameter than the upper side; the mount body 18 is inserted therein from the lower opening, and secured press-fit therein detained by a detent shoulder portion 80. At the opening on the upper side, there is formed an abutting portion 82 that extends inwardly, and a stopper function in the rebound direction is achieved by means of the stopper portion 22 of the first mounting member 12 coming into abutment with the abutting portion 82 via the abutting rubber 42. The abutting portion 82 is perforated by an insertion hole 84, maintaining a suitable gap with respect to the fastening shaft 24 of the first mounting member 12, so as to permit relative displacement of the first mounting member 12 in the axis-perpendicular direction. An umbrella-like shield member 86 is attached to the fastening shaft 24 of the first mounting member 12, so as to extend out and cover the insertion hole 84 of the stopper fitting 20.

The second mounting member 14 that has been fitted into the stopper fitting 20 is now secured press-fit therein detained by a detent shoulder portion 80, thereby securing it so as to be unable to slip out. Several leg portions 88 that project from the outer peripheral face and extend downward are affixed to the stopper fitting 20, these leg portions 88 being positioned on the body of the automobile (not shown) and fastened with fastening bolts to attach the engine mount 10 to the of the automobile.

In the mount body 18, the oscillation plate 56 disposed on the partition member 50 is secured superposed in intimate contact with the connecting fitting 38 disposed on the diaphragm 36. An actuating rod 90 that functions as a connecting rod and an inner rod is affixed to the oscillation plate 56 and the connecting fitting 38, with the actuating rod 90 projecting axially downward from the oscillation plate 56 and the connecting fitting 38.

A clamped rubber layer 92 integrally formed with the diaphragm 36 covers substantially the entire circumference of the connecting fitting 38, thereby providing a fluidtight seal at the mating face thereof with the oscillation plate 56. The oscillation plate 56 and the connecting fitting 38 are superposed top to bottom at their centers, with a caulked portion 94 integrally formed on the upper end of the actuating rod 90 passed through these center portions. By means of the caulked portion 94, the oscillation plate 56 and the connecting fitting 38 are caulked in intimate contact, with the actuating rod 90 projecting axially downward from the oscillation plate 56 and towards the outside through the connecting fitting 38, unifying the oscillation plate 56 and the connecting fitting 38, and forming a recess 96 that opens towards an armature 112, described later. In proximity to the peripheral wall 98 of the recess 96 a cushion rubber portion 100 having a shape that covers the peripheral wall 98 is integrally formed with the diaphragm 36.

An electromagnetic oscillator 102 serving as the solenoid actuator is situated axially below the second mounting member 14 with the projecting actuating rod 90, i.e. on the opposite side of the oscillation plate 56 and the connecting fitting 38 from the working fluid chamber 66, supported by the second mounting member 14.

Figure 2:
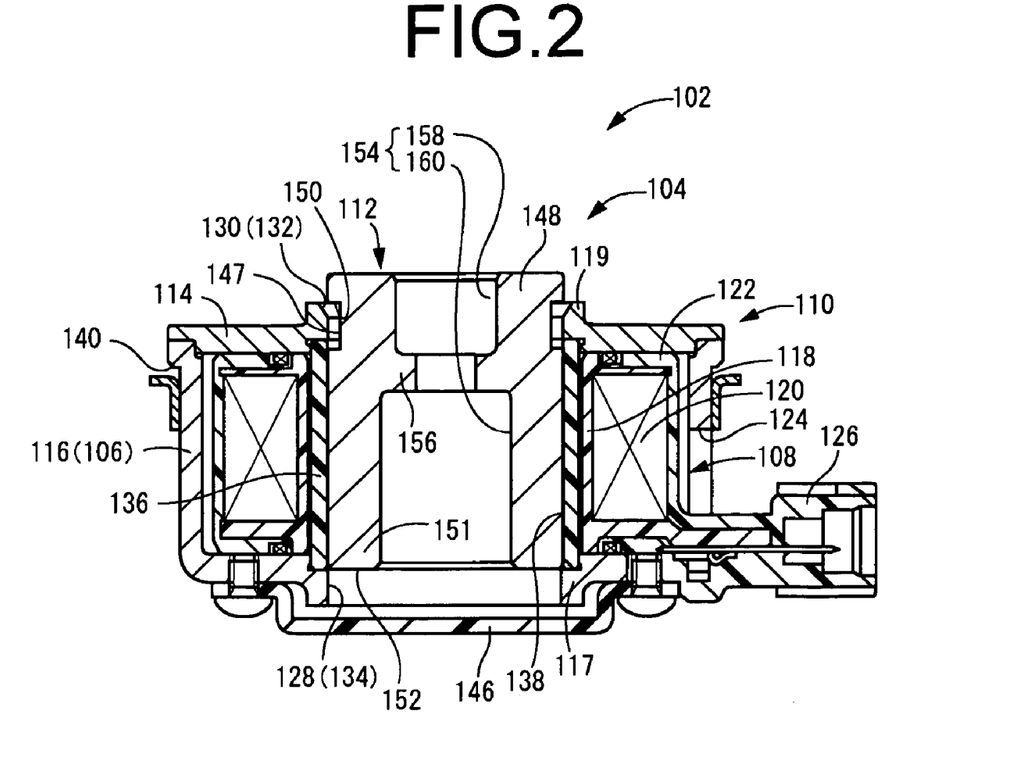
FIG. 2 is an axial cross sectional view of a solenoid actuator of the engine mount of FIG. 1.

In FIG. 2, the electromagnetic oscillator 102 is depicted in cross section. The electromagnetic oscillator 102 is composed of a solenoid 104, and a housing 106 supporting the solenoid 104 housed therein. More specifically, the solenoid 104 is composed of a stator in the form of a magnetic pole forming member 110 comprising a coil member 108; and an armature 112 serving as the movable element, positioned so as to be capable of relative displacement in the axial direction with respect to the coil member 108. In this embodiment in particular, the housing is not a separate independent member; instead, the lower yoke 116 that constitutes part of the magnetic pole forming member 110 serves as the housing 106.

The magnetic pole forming member 1110 is composed of the coil member 108, and an upper yoke 114 and the lower yoke 116 of ferromagnetic material attached as a yoke member about the perimeter of the coil member 108; additionally, the coil member 108 has a coil 120 wrapped around a bobbin 118, with a cover member 122 of nonmagnetic material disposed covering the outside periphery of the coil 120. The cover member 122 is produced by resin molding after the coil 120 has been wound onto the bobbin 118, for example. This cover member 122 has integrally formed therein a power supply opening 126 which projects to the outside from an opening 124 made through the lower yoke 116; power is supplied to the coil 120 via a terminal disposed within the power supply opening 126. The driving voltage having the frequency component supplied to the coil 120 is not limited to alternating current, with pulsating current being acceptable as well; and control is not limited to analog, but may be digital instead.

The lower yoke 116 which serves as the housing 106 has a lower through-hole 128 made in the center portion thereof, and is formed with an "L" shaped cross section extending substantially all the way around the circumference so as to enclose the outer circumferential surface and the lower end face of the coil member 108. A lower thick portion 117 with thickness projecting downward somewhat is formed in proximity to the inside peripheral face of the lower through-hole 128.

The upper yoke 114 is disposed on the upper end face of the coil member 108. The upper yoke 114 is of generally annular disk shape with an upper through-hole 130 of diameter dimension approximately equal to the lower through-hole 128 of the lower yoke 116, with the edge on the inner peripheral side constituting an upper thick portion 119 formed somewhat thicker, while the edge on the outer peripheral side is positioned covering the coil member 108, in a state of contact with the upper end of the lower yoke 116.

The upper yoke 114 and the lower yoke 116 constitute a stator-side magnetic path through which flows magnetic flux generated by energizing the coil 120, while the upper thick portion 119 and the lower thick portion 117 formed on the upper through-hole 130 and the lower through-hole 128 constitute magnetic pole forming portions where the respective magnetic poles form; and the inside peripheral edge portions of the upper through-hole 130 and the lower through-hole 128 respectively constitute an upper magnetic pole end face 132 and a lower magnetic pole end face 134 as the stator-side magnetic pole end faces.

Figure 3:
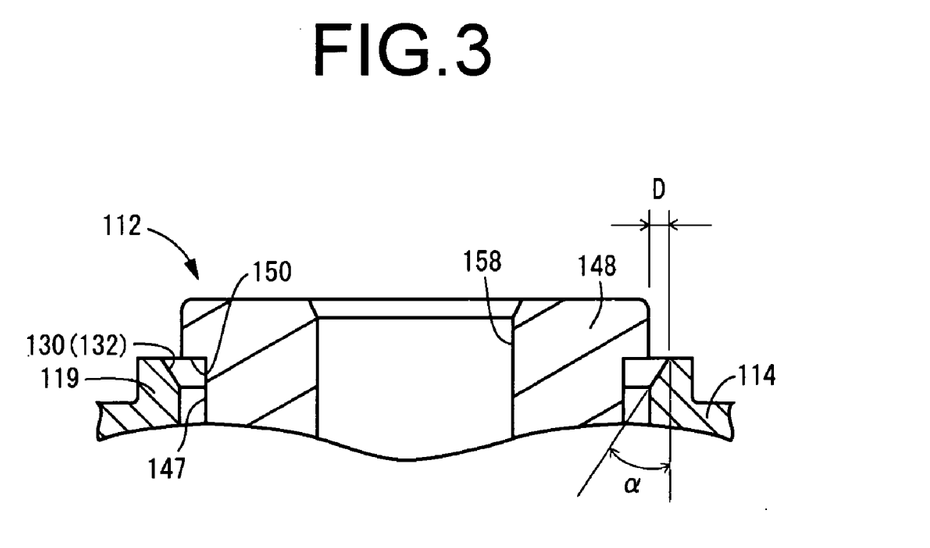
FIG. 3 is a fragmentary enlarged view of the solenoid actuator of FIG. 2.

As depicted in FIG. 3, the upper edge of the upper through-hole 130 where the upper magnetic pole end face 132 is formed is constituted as a tapered face that decreases in diameter going in the direction of attraction of the armature 112 (in this embodiment, axially inward). The magnetic acting force stabilizing portion is formed by this tapered face. In this embodiment in particular, the slope angle: α of the upper magnetic pole end face 132 will be set such that α=0.5-10°, preferably 1.0-5.0°. In FIG. 1 to FIG. 3, in order to facilitate understanding of the tapered face of the upper magnetic pole end face 132, the slope is depicted more exaggerated than it actually is. In this embodiment, the maximum separating distance "D" in the axis-perpendicular direction between the upper magnetic pole end face 132 and the upper wall face 150 of the armature 112 constituting the movable element-side magnetic pole end face described later, will not exceed 1.0 mm, preferably not exceed 0.5 mm, and more preferably not exceed 0.2 mm; but will be at least 0.01 mm.

Within the center hole of the coil 120 constituting the stator, there is installed a guide sleeve 136 arranged so as to cover the openings at the upper and lower inside peripheral edge portions formed by the upper yoke 114 and the lower yoke 116. In this embodiment, the stator is composed to include this guide sleeve 136, and the center hole of the guide sleeve 136 constitutes a tubular guide face 138 serving as a guide hole. That is, the tubular guide face 138 of the guide sleeve 136 is constituted as a tube shaped face slightly smaller in diameter than the magnetic pole inside faces of the upper yoke 114 and the lower yoke 116, and is positioned slightly inward in the diametrical direction from the magnetic pole inside faces of the upper and lower yokes 114, 116.

The material for the tubular guide face 138 is not particularly limited provided it is nonmagnetic, but will preferably be formed of a low-friction material in order to afford smooth guiding action. Additionally, since the interior of the center hole of the coil 120 tends to heat up to high temperature due to passage of current through the coil 120, it is preferable to use a material with excellent heat resistance that resists warping and other deformation when exposed to high temperatures. Examples are nonmagnetic metals such as stainless steel, aluminum, titanium, copper, or nickel; and resins such as polyethylene, polytetrafluoroethylene, nylon 66, or phenolic resins.

Meanwhile, a mating groove 140 is cut on the outside peripheral edge of the housing 106, and a detent piece 142 formed on the lower edge of the second mounting member 14 fits into this mating groove 140 and is detained thereby, thus attaching the magnetic pole forming member 110 of the electromagnetic oscillator 102 so as cover the lower end opening of the second mounting member 14. In this way, in this embodiment, the electromagnetic oscillator 102 is fastened directly to the second mounting member 14 without interposing any bracket or other separate element, thus reducing positioning deviation of the center axes of the oscillation plate 56 and the coil 120 during assembly. Since a clamped rubber element 144 formed by extending the diaphragm 36 downward is clamped between the housing 106 of the electromagnetic oscillator 102 and the second mounting member 14, chatter of the electromagnetic oscillator 102 is prevented. With this arrangement, the center axis of the coil 120 is substantially aligned with the center axis of the mount body 18, and coincident with the center axis of the second mounting member 14 and the oscillation plate 56. A cover member 146 is bolted to the bottom of the housing 106, to prevent dust and the like from infiltrating into the lower through-hole 128 of the housing 106.

The armature 112 is assembled within the tubular guide face 138 of the magnetic pole forming member 110 in which the coil 120 has been installed. The armature 112 is formed of a ferromagnetic body of generally cylindrical block shape overall; its outside diameter dimension is slightly smaller than the inside diameter dimension of the guide sleeve 136, and it is assembled fitting within the guide sleeve 136 so as to be capable of relative displacement in the axial direction on approximately the same center axis as the coil 120. Additionally, the armature 112 has an axial length dimension spanning the upper and lower magnetic pole end faces 132, 134, and in proximity to the upper magnetic pole end face 132 there is formed a circumferential groove 147 that opens onto the outer circumferential surface. The upper end portion 148 above the circumferential groove 147, and the lower end portion 151 of the armature 112 constitute movable element-side magnetic pole forming portions where the magnetic poles form when current is passed through the coil 120; and the upper wall face 150 of the circumferential groove 147 and lower end face 152 of the armature 112 constitute movable element-side magnetic pole forming portions. By so doing, as illustrated in the drawings, magnetic gaps in which effective magnetic attracting force is generated are formed in location-adjusted manner between the upper wall face 150 and the upper magnetic pole end face 132, and between the lower end face 152 and the lower magnetic pole end face 134, respectively. The outer circumferential surface of the armature 112 is subjected to a low friction treatment or anticorrosion treatment with any of various coating materials known in the art.

A through-hole 154 is bored through the center axis in the armature 112 to serve as a mating hole. An inward protruding portion 156 is formed in the axially medial portion of this through-hole 154; to either side of the inward protruding portion 156, the through-hole 154 consists of a small-diameter portion 158 on the side axially above and a large-diameter portion 160 on the side axially below.

The actuating rod 90 is inserted through the through-hole 154 of the armature 112 with a gap to allow some play, and with the lower end thereof projecting downward beyond the inward protruding portion 156 of the armature 112. To this projecting lower end of the actuating rod 90 is externally fitted an annular support member 162 having an outside diameter dimension somewhat larger than the inside diameter dimension of the inward protruding portion 156, and supported non-detachably on the actuating rod 90 by means of a support bolt 164 screwed into the distal end of the actuating rod 90. This support member 162 is detained against the lower face of the inward protruding portion 156 of the armature 112, whereby the armature 112 is detained non-detachably from the support member 162 in the axial direction.

On the actuating rod 90 on the opposite side of the inward protruding portion 156 from the support member 162, there is externally fitted an annular holding member 166 having an outside diameter dimension larger than the inside diameter dimension of the inward protruding portion 156, with the holding member 166 superposed against the upper face of the inward protruding portion 156. Additionally, the holding member 166 is subjected to urging force downward in the axial direction by means of an O-ring 170 consisting of a rubber elastic body externally fitted onto the actuating rod 90 while clamped between a stepped face 168 formed in the axial medial portion of the actuating rod 90, and the upper face of the holding member 166. The tightening force of a support bolt 164 acts on this O-ring 170 between the stepped face 168 and the holding member 166. Thus, the O-ring 170 exhibits spring rigidity such that it undergoes substantially no deformation in response to actuating force in the axial direction on the order of that exerted on the actuating rod 90 by the armature 112.

In this way, the holding member 166 and the support member 162 are juxtaposed against the inward protruding portion 156 of the armature 112 from above and below, and are held in abutment due to the elasticity of the O-ring 170, whereby the armature 112 is positioned substantially fixedly in the axial direction. Due to the elasticity of the O-ring 170, the actuating rod 90 and the armature 112 are linked while positioned relative to one another in the axial direction; and actuating force acting on the armature 112 by current flowing through the coil 120 is exerted on the actuating rod 90 in the axial direction. By means of linking the armature 112 and the oscillation plate 56 via the actuating rod 90, the oscillation plate 56 functions as the oscillation member of the electromagnetic oscillator 102 serving as the solenoid actuator.

The relative axial position of the actuating rod 90 with respect to the armature 112 can be adjusted by adjusting the tightening level of the support bolt 164; the support bolt 164, the support member 162, the inward protruding portion 156, the holding member 166, and the O-ring 170 together make up axial direction linking means. By means of this axial direction linking means, it is possible to adjust the axial position of the armature 112 with respect to the magnetic pole forming member 110, i.e. the relative position of the upper wall face 150 and lower end face 152 of the armature 112, to the upper and lower magnetic pole end faces 132, 134 of the magnetic pole forming member 110. The axial position of the armature 112 is established such that in its initial position without current supply to the coil 120, it will be situated as the location of maximum magnetic attracting force (in this embodiment, a location at which the upper wall face 150 and the upper magnetic pole end face 132 are at substantially the same height, and the lower end face 152 and the lower magnetic pole end face 134 are at substantially the same height).

The support member 162, the holding member 166, and the actuating rod 90 are disposed such that a certain gap is formed between the axis-perpendicular opposing faces of the outer circumferential surfaces of these elements on the one hand, and the inside peripheral face of the armature 112 on the other. By means of adjusting the abutting force of the support member 162 and the holding member 166 against the inward protruding portion 156 produced by the elasticity of the O-ring 170, in the event that the armature 112 is subjected to external force in the axis-perpendicular direction at a level exceeding the static frictional force produced among the support member 162, the holding member 166 and the inward protruding portion 156, relative slipping displacement of the armature 112 with respect to the actuating rod 90 in the axis-perpendicular direction will be permitted, whereby the inward protruding portion 156, the support member 162, the holding member 166 and the O-ring 170 constitute axis-perpendicular direction displacement-permitting means permitting relative displacement of the armature 112 with respect to the coil member 108. By means of this arrangement, it is possible to advantageously adjust for relative positional deviation of the actuating rod 90 and the armature 112 caused by component manufacturing dimensional errors or positioning errors during assembly, so that the armature 112 can be positioned stably in the axis-perpendicular direction with respect to the coil 120, as well as adjusting for temporary axial deviation during actuator operation, so as to achieve stable operating characteristics.

The level of relative displacement of the armature 112 with respect to the actuating rod 90 in the axis-perpendicular direction is determined by the distance between the opposing faces of the support member 162, the holding member 166 and the outside peripheral end of the actuating rod 90 on the one hand, and the inside peripheral face of the armature 112 on the other. A range of 0.2-3 mm is favorably employed for this permitted level of displacement. In order to achieve better slipping displacement of the armature 112, it would be acceptable, for example, to attach sliding portions of low-friction material such as polyethylene or polytetrafluoroethylene to these sliding faces, or to subject them to low-friction treatment.

While not shown in the drawing, in the engine mount 10 having the construction described above, it is possible to control current flow to the coil 120; this control of current flow can be accomplished, for example, by means of adaptive control or other feedback control, using the engine ignition signal of the power unit as a reference signal and the vibration detection signal of the component being damped as an error signal; or on the basis of control data established in advance. With this arrangement, by producing magnetic force acting on the armature 112 to actuate it downward in the axial direction, and then halting current flow to the coil 120 and allowing the recovery force of the support rubber elastic body 54 to act, it becomes possible to subject the oscillation plate 56 to actuating force which corresponds to the vibration being damped, and thus to achieve active vibration damping action by internal pressure control of the working fluid chamber 66.

In the engine mounting of this embodiment, the upper magnetic pole end face 132 has a tapered shape that gradually varies the magnetic acting force exerted on the armature 112 in accordance with displacement of the armature 112, whereby abrupt change in the magnetic attracting force exerted on the armature 112 can be reduced within the actuation range of the armature 112, making it possible to achieve stable magnetic attracting force.

Specifically, the magnetic acting force exerted on the armature 112 is not magnetic acting force between two points generated between the edges in the magnetic pole forming portions as in the conventional construction, but is rather exerted as the sum of magnetic acting force produced between point on the tapered upper magnetic pole end face 132, and thus the change in total magnetic acting force is reduced despite some level of change in relative position of the armature 112 and the upper magnetic pole end face 132, making it possible to achieve stable magnetic acting force over a wide range.

Since abrupt change in magnetic attracting force is suppressed within the actuation range of the armature 112, despite deviation in relative position of the armature 112 with respect to the magnetic pole forming member 110 among individual product units, differences in magnetic attracting force due to positional deviation can be minimized. It is thus possible to provide consistent vibration damping characteristics over a series.

Additionally, by suppressing change in magnetic attracting force due to deviation in relative positional deviation of the armature 112 with respect to the magnetic pole forming member 110, it is possible to avoid change in vibration damping characteristics, even in the event of permanent set in fatigue of the support rubber elastic body 54 in association with deterioration over time, and resultant change in the relative position of the armature 112 with respect to the magnetic pole forming member 110. It is accordingly possible to achieve the desired vibration damping characteristics over an extended period.

Figure 4:
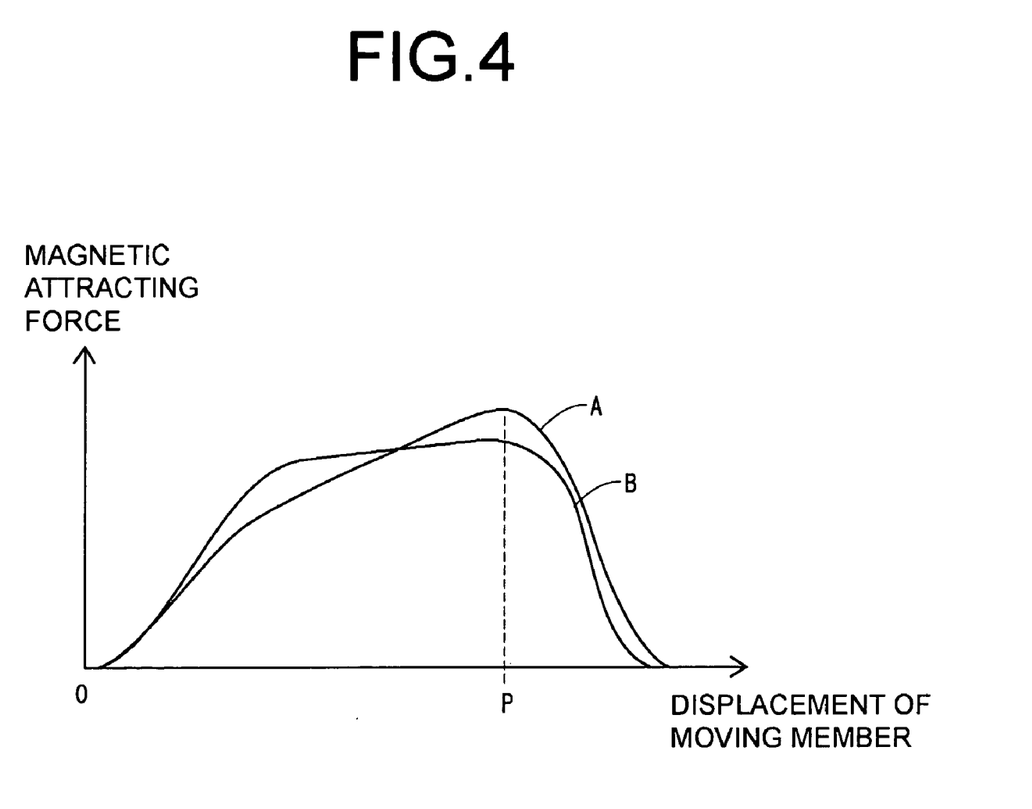
FIG. 4 is a graph showing the results of measurement of change in magnetic attracting force exerted in accordance with displacement of the moving member, in the present engine mount and in an engine mount of conventional construction.

FIG. 4 shows the results of measurement of change in magnetic attracting force exerted in accordance with displacement of the moving member, in an engine mount 10 of construction according to this embodiment and in an engine mounting of conventional construction. Curve A in FIG. 4 indicates change in magnetic attracting force in the engine mounting of conventional construction; while Curve B indicates change in magnetic attracting force in the engine mount 10 of this embodiment. In FIG. 4, the origin (position at which moving member displacement is zero) indicates the position at which the height positions of the upper and lower end faces of the armature 112 respectively equal the height positions of the upper end face of the upper magnetic pole end face 132 and the lower end face of the lower magnetic pole end face 134. On the other hand, position "P" indicates the position at which the height position of the upper wall face 150 of the armature 112 equals the height position of the upper end face of the upper magnetic pole end face 132, and the height position of the lower end face 152 of the armature 112 equals the height position of the upper end of the lower magnetic pole end face 134; in the engine mountings of both the embodiment and conventional construction, magnetic attracting force reaches maximum at this position "P". In order to achieve efficient output, typically, position "P" will be the initial position of the armature 112 in the absence of current flowing to the coil 120, and a predetermined range of displacement of the armature 112 in the direction approaching the upper and lower yoke 114, 116 side (coil 120 side) from position "P" will be employed as the excitation actuation range for the armature 112.

Figure 5:
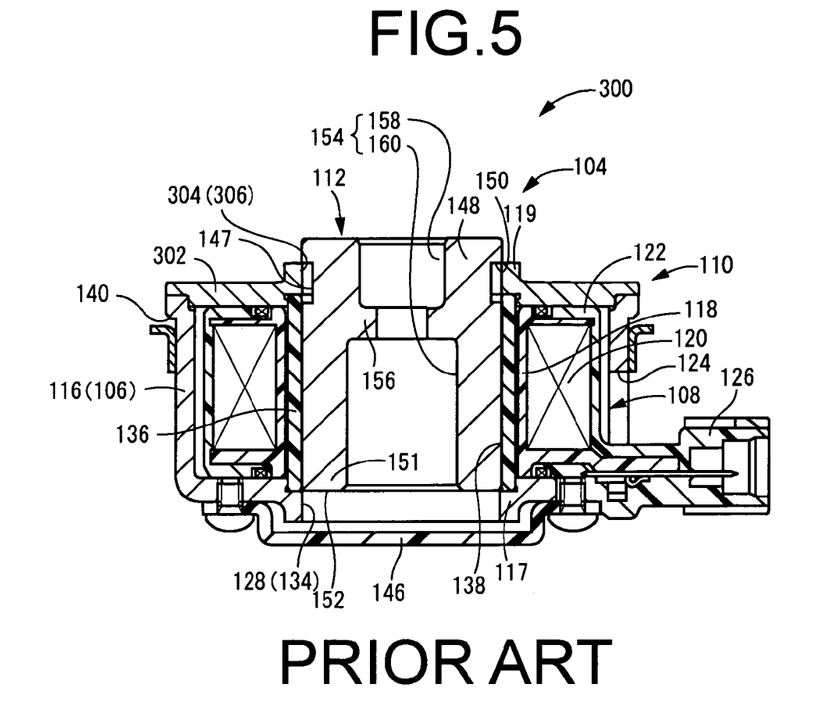
FIG. 5 is an axial cross sectional view of a solenoid actuator used in a conventional engine mount.

As depicted in FIG. 5, in the electromagnetic oscillator 300 employed as the test unit of conventional construction has construction generally similar to that of the electromagnetic oscillator 102 discussed previously, except that the inside peripheral face of an upper through-hole 304 formed in the upper yoke 302 is formed opening with unchanging diameter dimension in the axial direction, so that the upper magnetic pole end face 306 has unchanging diameter dimension along the direction of actuated displacement of the armature 112; components and areas of similar construction to the electromagnetic oscillator 102 discussed previously will be assigned the same symbols as the electromagnetic oscillator 102 in the drawings, and will not be described in any detail.

As will be apparent from FIG. 4, in the engine mount 10 of construction in accordance with this embodiment, as compared to the conventional construction, magnetic attracting force in proximity to position "P" is made to vary gradually, suppressing abrupt change in the magnetic attracting force exerted on the armature 112. With this arrangement, despite deviation in the initial position of the armature 112 among individual product units, due to component manufacturing tolerances associated with molding shrinkage of the support rubber elastic body 54, assembly errors, or the like, deviation in magnetic attracting force exerted on the armature 112 can be reduced, and consistent characteristics provided over the series.

Additionally, since the thrust difference of magnetic attracting force in proximity to position "P", which is the initial position of the armature 112, is small, in the engine mount 10 by itself, consistent magnetic attracting force can be exerted over the actuation range of the armature 112, and excitation actuation can be carried out in a stable manner.

While the invention has been shown hereinabove in terms of a certain embodiment, various other forms may be employed as the specific form of the magnetic acting force stabilizing portion. Several preferred structures for an actuator furnished with a magnetic acting force stabilizing portion are described hereinbelow by way of example, but the magnetic acting force stabilizing portion of the invention should not be construed as limited thereto. In the actuators described below, components and areas of similar construction to the first embodiment discussed previously will be assigned the same symbols as the first embodiment in the drawings, and will not be described in any detail.

Figure 6:
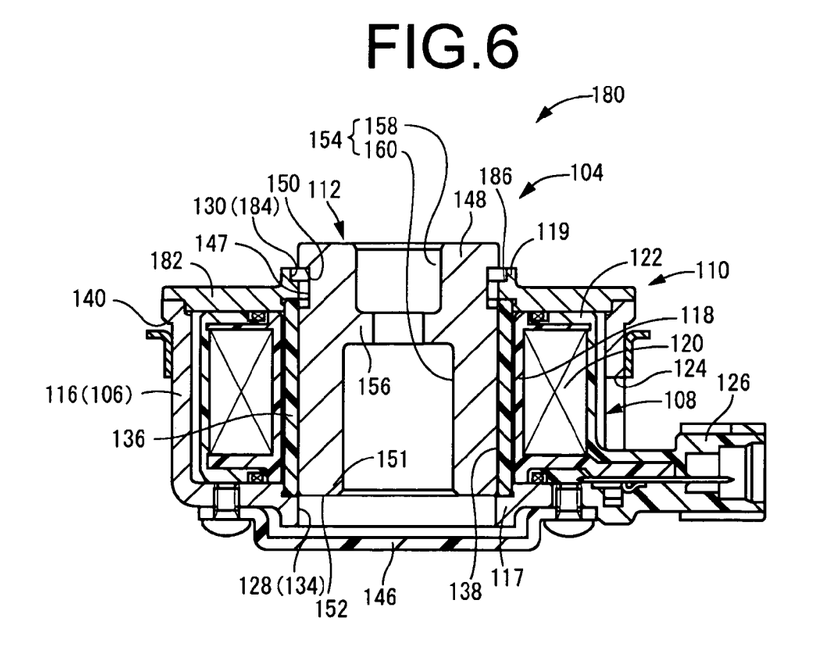
FIG. 6 is an axial cross sectional view of a solenoid actuator used in an engine mount of construction according to a second embodiment of the present invention.
Figure 7:
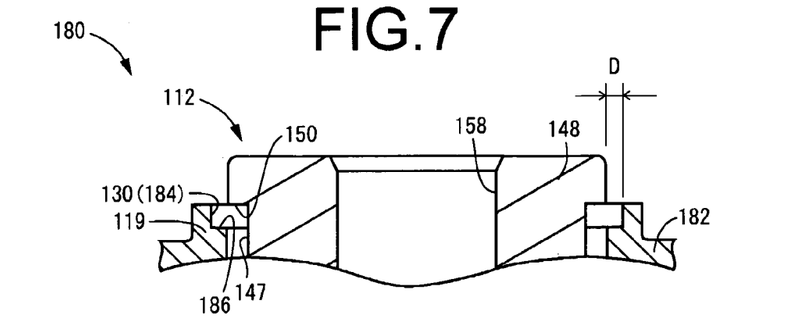
FIG. 7 is a fragmentary enlarged view of the solenoid actuator of FIG. 6.

FIG. 6 and FIG. 7 depict an electromagnetic oscillator 180 pertaining to a second embodiment of the invention. In this electromagnetic oscillator 180 a stepped portion 186 serving as the magnetic acting force stabilizing portion is formed on the upper magnetic pole end face 184 on the upper yoke 182, and is smaller in diameter towards the direction of attraction of the armature 112 (axially downward). In this embodiment in particular, the maximum separation distance "D" in the axis-perpendicular direction separating the upper magnetic pole end face 184 and the upper wall face 150 of the armature 112 does not exceed 1.0 mm, preferably not exceed 0.5 mm, and more preferably not exceed 0.2 mm, but is at least 0.01 mm. With this configuration as well, abrupt change in the level of magnetic acting force exerted on the armature 112 can be suppressed. The stepped portion 186 in FIG. 6 and FIG. 7 and the curving face 187 in FIG. 8, described later, are depicted with exaggerated shape, to aid in understanding of their shapes.

Figure 8:
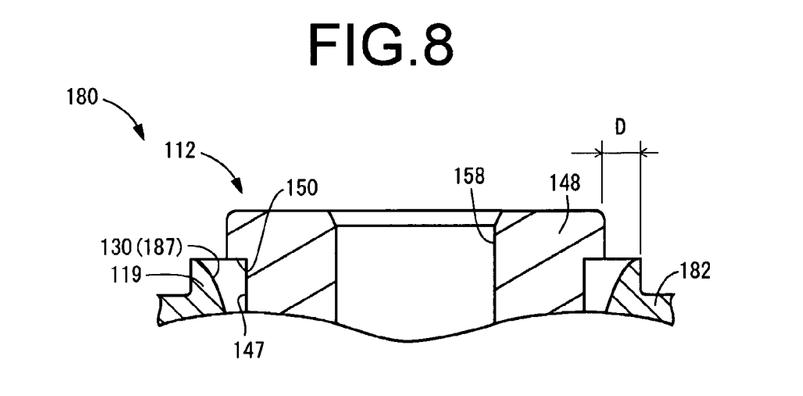
FIG. 8 is a fragmentary enlarged view of another arrangement of the solenoid actuator of FIG. 6.

In this way, it is possible to employ any of various shapes as the specific shape of the upper magnetic pole end face 184 formed on the upper yoke 182. As yet another different form for the magnetic acting force stabilizing portion, it would be possible to have a curving face 187 extending axially upward as depicted in FIG. 8, for example.

Figure 9:
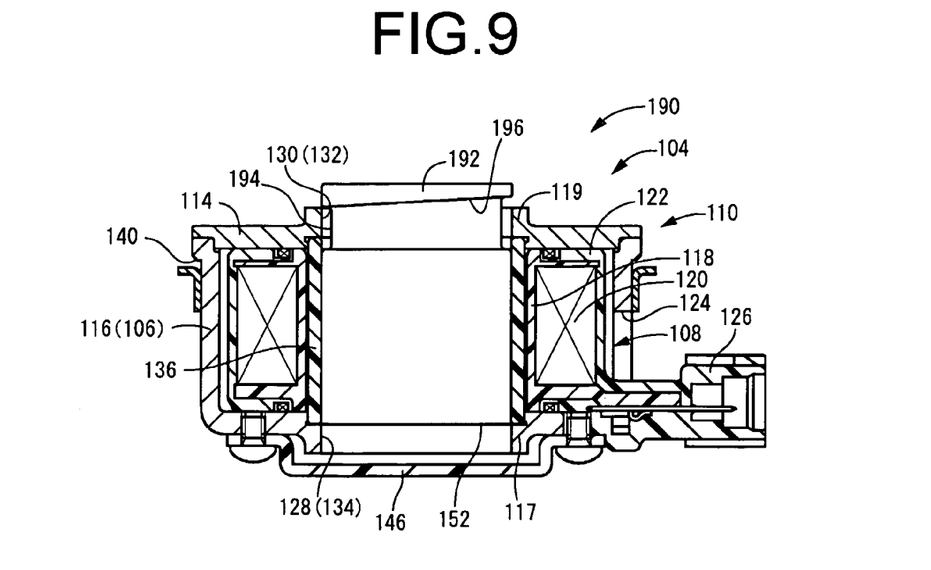
FIG. 9 is an axial cross sectional view of a solenoid actuator used in an engine mount of construction according to a third embodiment of the present invention.
Figure 10:
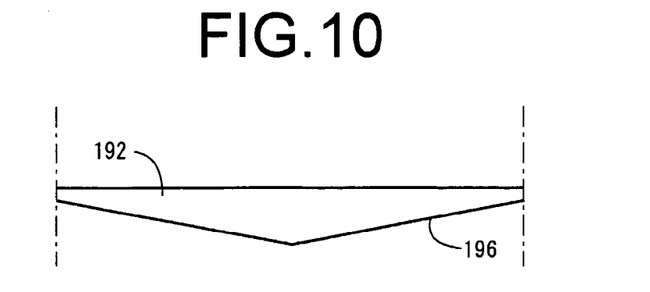
FIG. 10 is a fragmentary enlarged view of the solenoid actuator of FIG. 9.

The magnetic acting force stabilizing portion may also be disposed on the moving member side. For example, FIG. 9 depicts an electromagnetic oscillator 190 pertaining to a third embodiment of the invention. The armature 192 in FIG. 9 is shown in exterior view. In the electromagnetic oscillator 190 of this embodiment, the upper wall face 196 of a circumferential groove 194 formed as a groove in the circumferential direction opening onto the outer peripheral face of the armature 192 is designed with axial height dimension that varies in the circumferential direction as depicted in development view in FIG. 10, and is formed so as to head upward gradually in the axial direction. The upper wall face 196 constitutes the magnetic acting force stabilizing portion. The development view shown in FIG. 10 is a development view depicting the area above the upper wall face 196 in the armature 112 expanded in the circumferential direction.

In this sort of embodiment as well, magnetic acting force exerted on the armature 192 can be made to vary gradually over the actuation range of the armature 192. Specifically, by making the height dimension of the upper wall face 196 vary in the circumferential direction, in the event that the low area of the upper wall face 196 comes into closest proximity with the upper magnetic pole end face 132, and the armature 192 undergoes further displacement to reach a position that would cause an abrupt drop of magnetic acting force, since a magnetic gap with the upper magnetic pole end face 132 remains assured in the high area of the upper wall face 196, an abrupt drop in total magnetic acting force is effectively avoided.

In the third embodiment discussed above, it is possible to employ any of various shapes as the specific shape of the upper wall face 196 of the circumferential groove 194 constituting the magnetic acting force stabilizing portion; for example, it would be possible to employ shapes like those depicted in FIG. 11 to FIG. 14. FIG. 11 to FIG. 14 are development views depicting the area above the upper wall face 196 in the armature 112 in the third embodiment, shown expanded in the circumferential direction. In FIG. 11-FIG. 14, the entire length left to right represents 360° (the entire circumference).

Figure 11:
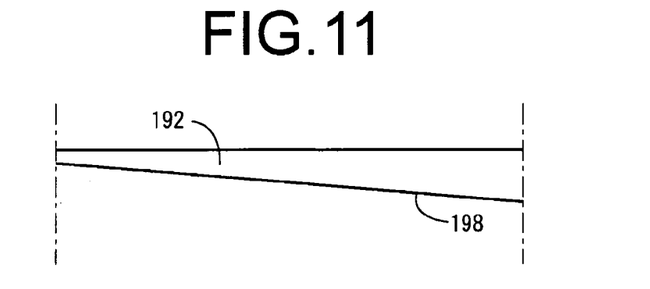
FIG. 11 is a fragmentary enlarged view of another arrangement of the solenoid actuator of FIG. 9.

The upper wall face 198 shown in FIG. 11 has a shape in which the lower end outside peripheral corner (edge portion) heads axially downward at an unchanging slope angle, so that the height dimension varies in the circumferential direction. With the edge portion of the construction depicted in FIG. 11, a stepped portion will be formed in the axial direction at one site on the circumference. The upper wall face 200 shown in FIG. 12 has a repeating saw-tooth shape that is continuous in the circumferential direction, whereby the lower end outside peripheral corner (edge portion) varies cyclically in the height direction (axial direction), so that there appear alternately in the circumferential direction multiple high areas and low areas in the height direction (axial direction), based on the lowest edge point of the edge portion.

Figure 12:
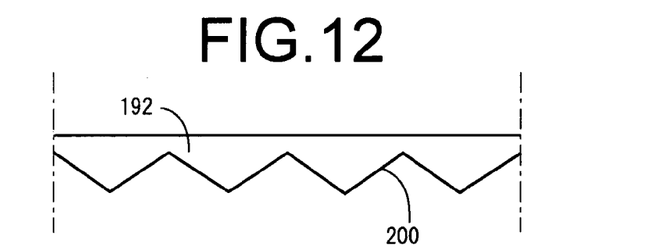
FIG. 12 is a fragmentary enlarged view of yet another arrangement of the solenoid actuator of FIG. 9.

Specifically, in FIG. 10 the cycle of variation of the axial position of the edge portion is 360° in the circumferential direction, and in FIG. 11 it is 720° (in actual practice only the equivalent of one-half cycle is formed), whereas in FIG. 12 it is 360/n° (where n is a natural number equal to 2 or greater). By imparting in the circumferential direction a small cycle of variation of the axial position of the lower end outside peripheral edge, which is dominant with respect to the generated magnetic force at the upper magnetic pole portion of the armature, axially downward-oriented magnetic force acting on armature can be made substantially uniform, thereby reducing tilt of the armature in the twisting direction.

Figure 13:
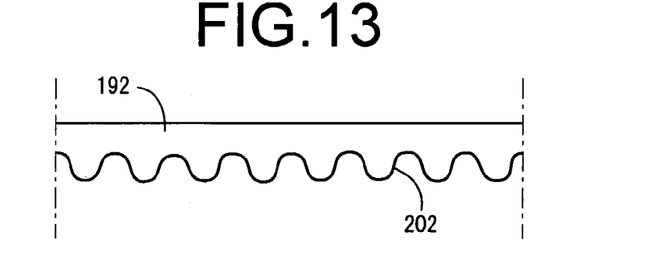
FIG. 13 is a fragmentary enlarged view of still another arrangement of the solenoid actuator of FIG. 9.
Figure 14:
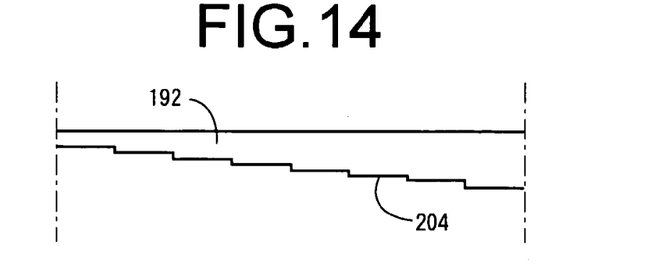
FIG. 14 is a fragmentary enlarged view of a further arrangement of the solenoid actuator of FIG. 9.

The upper wall face 202 shown in FIG. 13 has a shape in which the lower end outside peripheral edge (edge portion) varies cyclically up and down in an undulating shape. By employing such an undulating shape, it is easy to machine the upper wall face 202 of the armature. The upper wall face 204 shown in FIG. 14 has a shape in which the lower end outside peripheral edge (edge portion) is formed in a stepped configuration in the circumferential direction, so that its height dimension varies in the circumferential direction.

The embodiments described above are merely exemplary, it being possible to employ various shapes not limited to the shapes discussed above. For example, while the upper wall faces 196, 198, 200, 202, 204 were all formed with a given shape, combinations of different shapes would be acceptable as well. Additionally, by applying such shapes to the lower end face 152 of the armature 192, it becomes possible to vary in the circumferential direction the distance separating the lower end face 152 from the lower magnetic pole end face 134, to have the lower end face 152 constitute a magnetic acting force stabilizing portion. It would also be possible, instead of or in addition to forming such shapes on armature 192, to form them on the inner peripheral upper end edge portions of the stator-side magnetic pole portions (,i.e. the lower and upper thick portions) 117, 119 situated in opposition to the magnetic pole portions on the armature 192 side.

Figure 15:
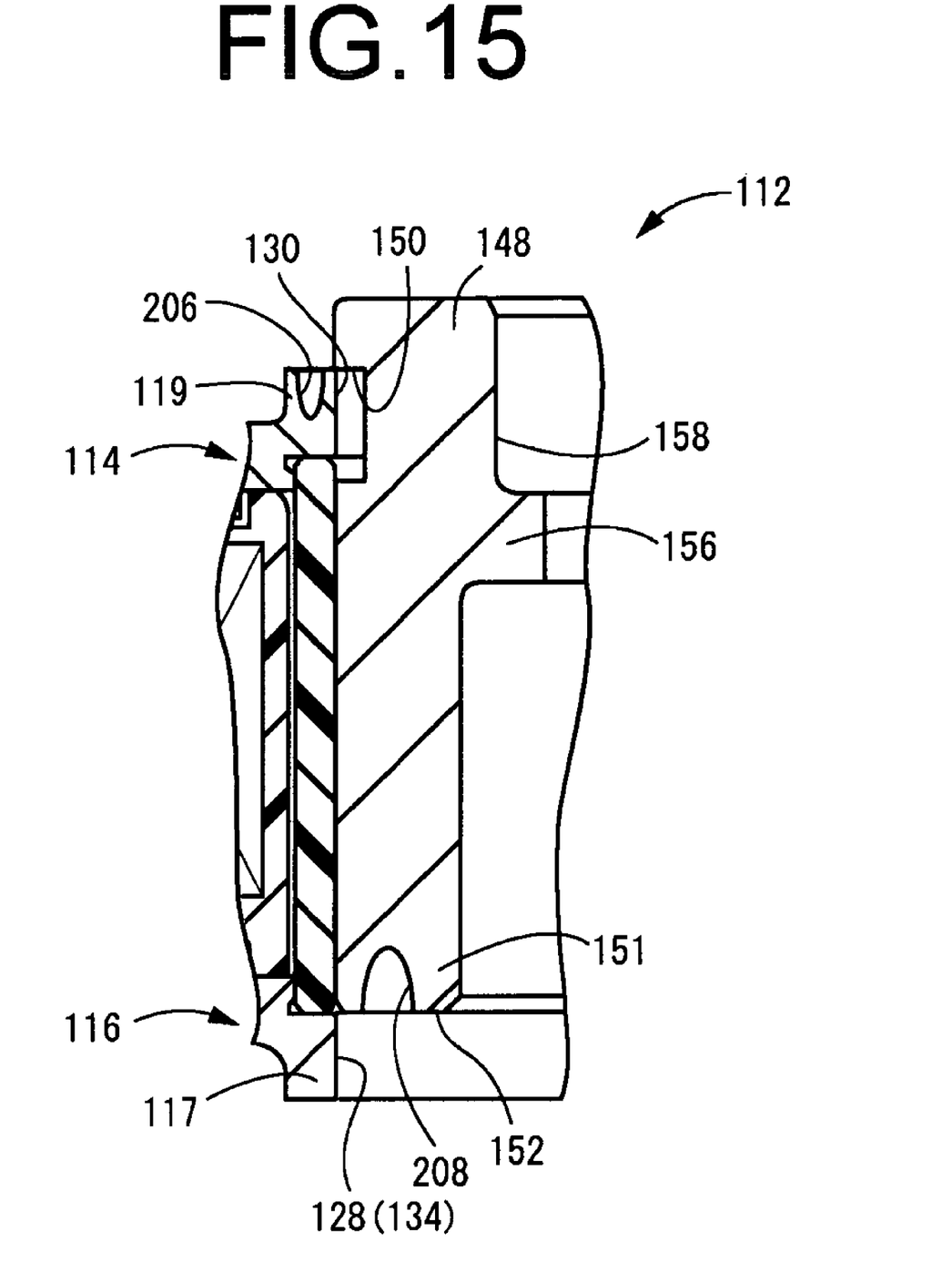
FIG. 15 is an axial cross sectional view of a solenoid actuator used in an engine mount of construction according to a fourth embodiment of the present invention.

As taught in the fourth embodiment depicted in FIG. 15, it is also possible to form the magnetic acting force stabilizing portion by forming circumferential direction lightening grooves 206, 208 extending in the circumferential in the upper thick portion 119 and the lower end portion 151 of the armature 112 respectively, to vary the thickness dimension in the actuation direction of the armature 112. According to this embodiment, abrupt decline in magnetic acting force can be suppressed by means of imparting greater thickness dimension to areas where magnetic acting force declines in accordance with actuated displacement of the armature 112, so as to increase the number of lines of magnetic force flowing through those areas. In this embodiment, the construction is one in which the circumferential direction lightening grooves are formed in the upper thick portion 119 and the lower end portion 151 of the armature 112, but it would of course be possible to form these in the lower thick portion 117 and the upper end portion 148 of the armature 112.

Particularly in the embodiment depicted in FIG. 15, the circumferential direction lightening grooves 206, 208 are each formed at locations proximate to the corners that form the magnetic pole portions (the upper end inside peripheral edge corner of the upper thick portion 119, and the lower end outside peripheral edge corner of the armature), with each of them having a vertical cross section that widens gradually towards the outside in the axial direction, and extending continuously around the circumferential direction with unchanging cross section. By means of forming these circumferential direction lightening grooves 206, 208, the corners that form the magnetic pole portions (the upper end inside peripheral edge corner of the upper thick portion 119, and the lower end outside peripheral edge corner of the armature) are each imparted with axis-perpendicular thickness dimension that increases gradually moving inwardly in the axial direction (i.e. axially upward or axially downward) from the axial upper end or lower end portion which are most dominant with respect to the generated magnetic force. In other words, the corners that form the magnetic pole portions (the upper end inside peripheral edge corner of the upper thick portion 119, and the lower end outside peripheral edge corner of the armature) have decreasing thickness dimension towards the ends in the axial direction.

Saturation flux is kept to a low level due to the smaller component thickness dimensions, and it is thought that as a result the corners that form the magnetic pole portions (the upper end inside peripheral edge corner of the upper thick portion 119, and the lower end outside peripheral edge corner of the armature) each experience a phenomenon whereby flux concentrated markedly at the distal corner (edge portion) thereof diffuses in the axial direction along the inside peripheral wall of the corner forming the magnetic pole portion, and is emitted into an air gap portion (across to the opposed face of the magnetic pole situated opposite). As a result, abrupt change in magnetic attracting force induced across the opposing faces of the magnetic pole pair constituting the armature 112 and the upper/lower yokes 114, 116 is suppress over a relatively large region of change in relative position in the axial direction (axial change in distance separating the opposing faces), thereby affording advantages analogous to those in the embodiments depicted in FIGS. 1-14.

While the present invention has been described in detail in its presently preferred embodiment, for illustrative purpose only, it is to be understood that the invention is by no means limited to the details of the illustrated embodiment, but may be otherwise embodied.

For example, the lower magnetic pole end face 134 can be given the form or a stepped face whose axial inside widens in diameter, thereby disposing a magnetic acting force stabilizing portion on the lower magnetic pole end face 134.

Additionally, by varying in the circumferential direction the height dimension of the upper wall face 150 of the armature 112 in the first embodiment described previously, it is possible to dispose magnetic acting force stabilizing portions on both the stator-side magnetic pole forming portion and the moving member-side magnetic pole forming portion.

When forming circumferential direction lightening grooves 206, 208 in the magnetic pole forming portions as depicted in FIG. 15, by means of gradually varying groove depth in the circumferential direction, it becomes possible to increase dispersion of magnetic force in the axial direction at the magnetic pole portions. Where such circumferential direction lightening grooves that vary gradually in the circumferential direction are formed, it is acceptable to employ grooves of cross sectional shape extending in the depth direction with substantially unchanging groove width dimension. It is possible to employ any of the arrangements depicted in FIGS. 1-14 in combination with the arrangement depicted in FIG. 15.

The specific form of the axial direction linking means for linking the armature 112 and the actuating rod 90 with their relative position adjustable in the axial direction is not limited to that described previously. For example, a male thread could be formed on the distal end of the actuating rod 90, and a nut member having an outside diameter dimension approximately equal to the support member 162 screwed on in place of the support member 162, thereby supporting the armature 112, as well as enabling adjustment of the axial position of the armature 112 by means of adjusting the tightening of the nut member.

It is also to be understood that the present invention may be embodied with various other changes, modifications and improvements, which may occur to those skilled in the art, without departing from the spirit and scope of the invention defined in the following claims.

What is claimed is:

1. An active vibration damping device comprising:
 a first mounting member and a second mounting member, the members attachable respectively to components linked to each other to make up a vibration transmission system;
 a main rubber elastic body elastically linking the first and second mounting members, defining one portion of a wall of a pressure receiving chamber having a non-compressible fluid sealed therein;
 an oscillation member defining another portion of the wall of the pressure receiving chamber;
 a solenoid actuator including: a stator having a coil and a yoke member attached about the coil to form a stator-side magnetic path with a guide hole extending along a center axis thereof; and a movable element positioned inserted into the guide hole of the stator so that actuating force in an axial direction is create between the stator and the movable element by means of supplying electrical current to the coil, the stator of the solenoid actuator being affixed to the second mounting member and the movable element being attached to the oscillation member so as to actively control pressure in the pressure receiving chamber by exciting actuation of the oscillation member, and a magnetic acting force stabilizing portion having a shape that gradually varies in association with axial displacement of the movable element an level of magnetic acting force between a movable element-side magnetic pole forming portion and a stator-side magnetic pole forming portion is disposed on at least one of the movable element-side magnetic pole forming portion where a magnetic pole is produced in the movable element and the stator-side magnetic pole forming portion where a magnetic pole is produced in the stator.

2. An active vibration damping device according to claim 1, wherein the magnetic acting force stabilizing portion is constituted by varying a separating distance between a movable element-side magnetic pole end face of the movable element-side magnetic pole forming portion situated in opposition to the stator-side magnetic pole forming portion, and a stator-side magnetic pole end face of the stator-side magnetic pole forming portion situated in opposition to the magnetic pole side magnetic pole forming portion, in a circumferential direction of the movable element and/or an actuation axis direction of the stator.

3. An active vibration damping device according to claim 2, wherein the magnetic acting force stabilizing portion is constituted by giving the stator-side magnetic pole end face a tapered shape gradually decreasing in diameter in an attraction direction of the movable element.

4. An active vibration damping device according to claim 2, wherein the magnetic acting force stabilizing portion is constituted by giving the stator-side magnetic pole end face a stepped face that is smaller in diameter in an attraction direction of the movable element.

5. An active vibration damping device according to claim 1, wherein the magnetic acting force stabilizing portion is constituted by forming a circumferential groove that opens onto an outer circumferential surface of the movable element to provide a movable element-side magnetic pole end face on a wall of the circumferential groove, and varying an axial height dimension of the movable element-side magnetic pole end face along a circumferential direction.

6. An active vibration damping device according to claim 1, wherein the magnetic acting force stabilizing portion is constituted by varying a thickness dimension of at least one of a movable element-side magnetic pole end face and a stator-side magnetic pole end face, along an actuation axis direction of the movable element.

7. An active vibration damping device according to claim 1, wherein the movable element-side magnetic pole forming portion of the movable element and the stator-side magnetic pole forming portion of the stator are arranged, at their initial position prior to current flow through the coil, at a location where maximum magnetic acting force is produced in the movable element-side magnetic pole forming portion and the stator-side magnetic pole forming portion.

8. An active vibration damping device according to claim 1, wherein a through-hole is disposed passing through the movable element in the axial direction, an inner rod projecting from the oscillation member is passed through the through-hole, and the movable element is linked to the inner rod so as to enable adjustment of axial position.

* * * * *